Patented Feb. 20, 1923.

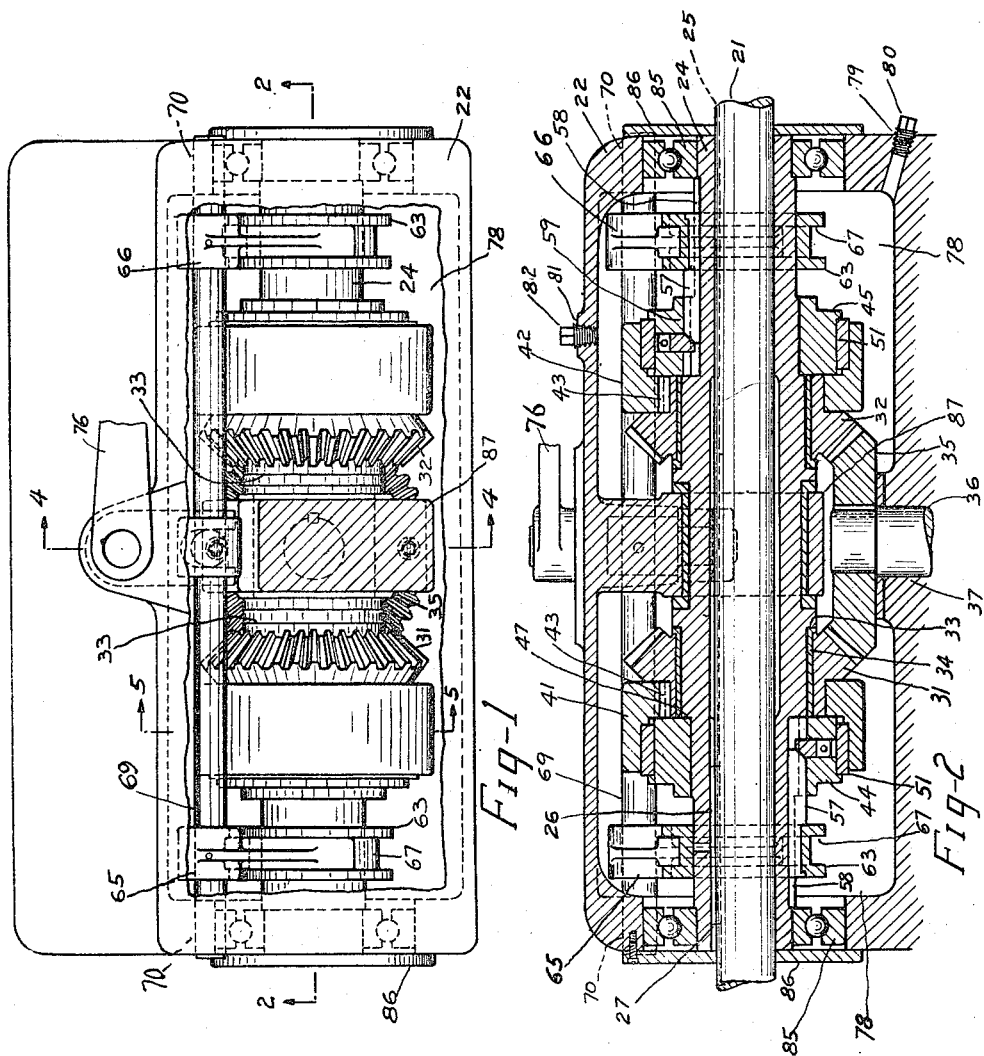

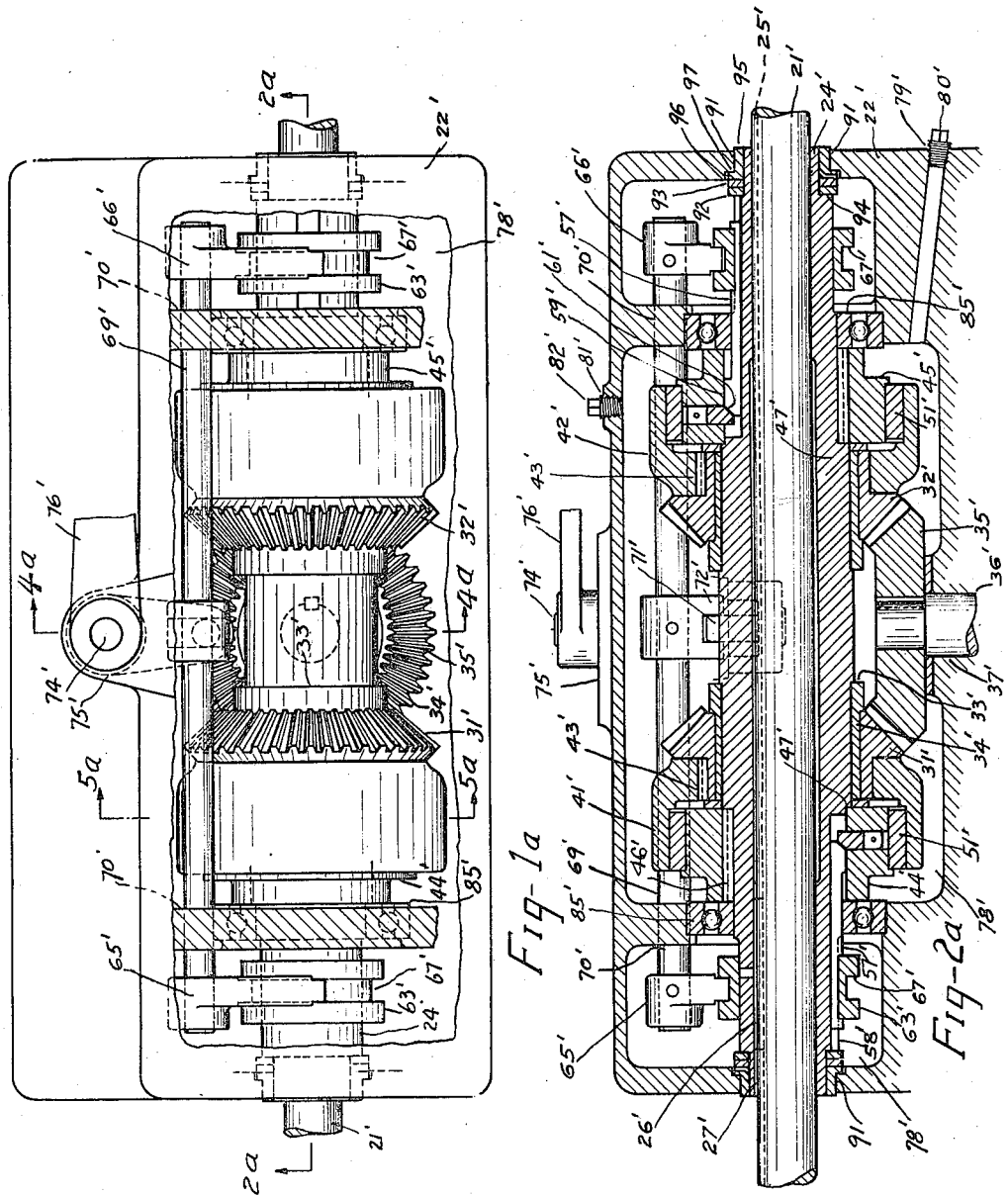

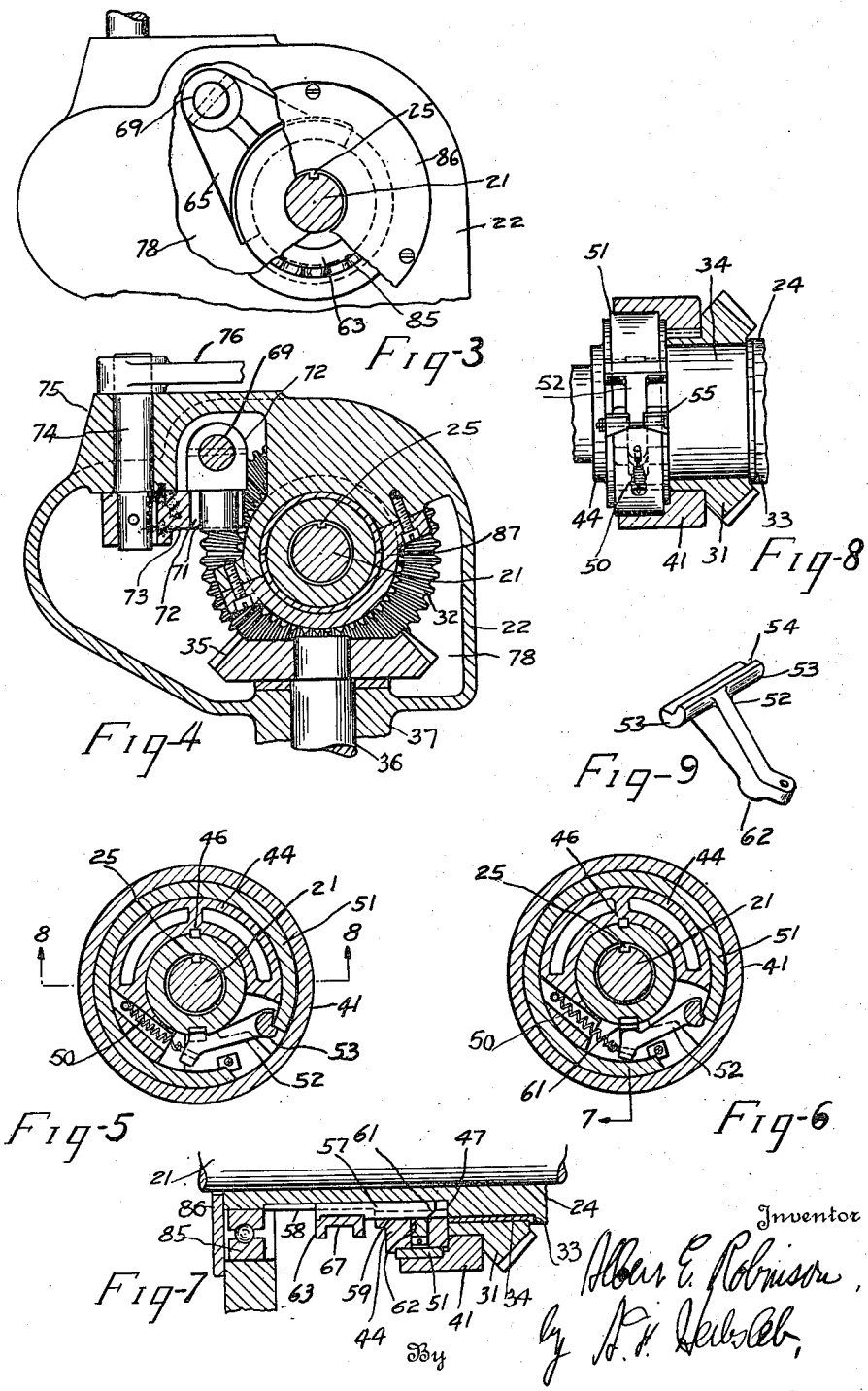

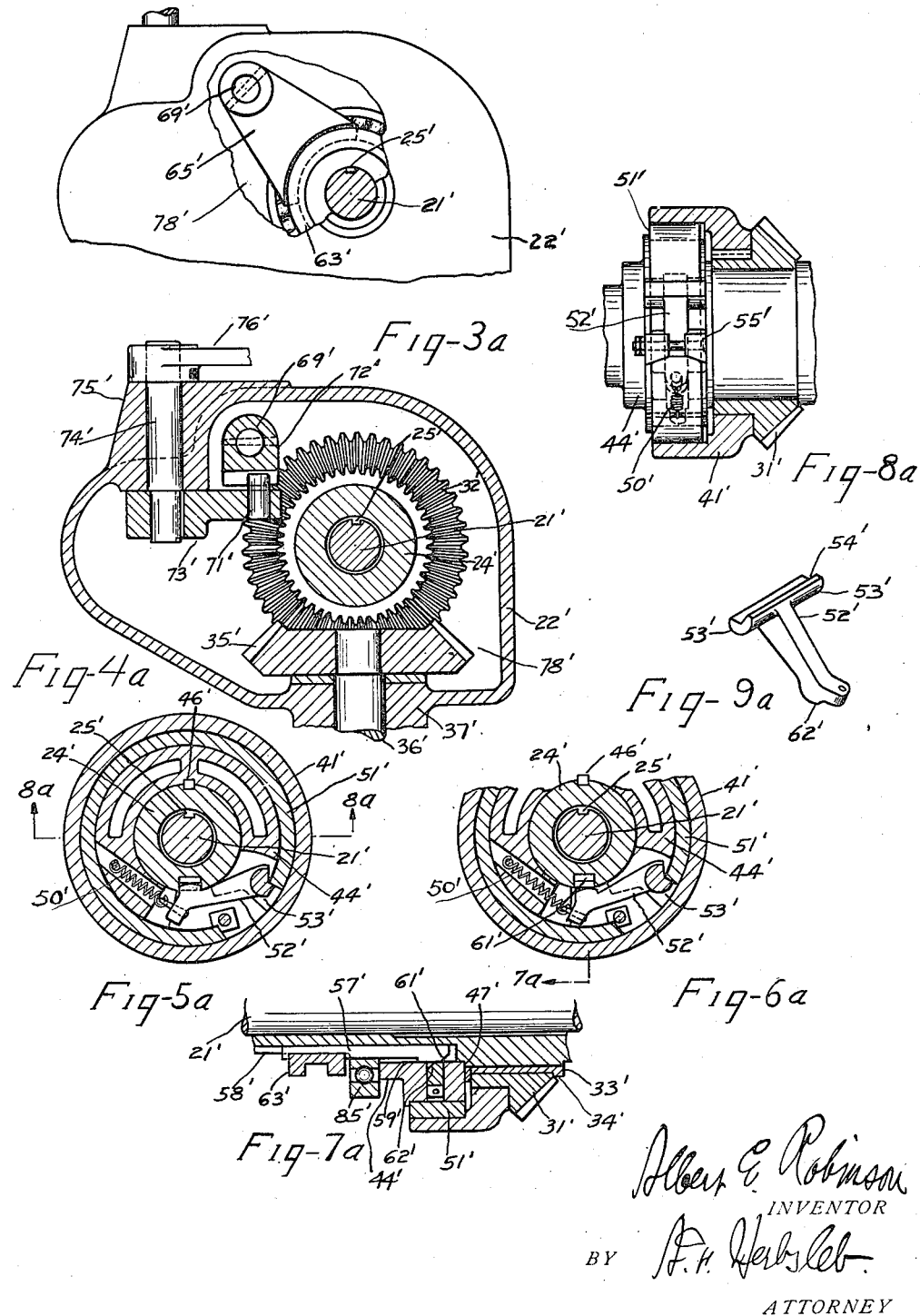

1,446,129

UNITED STATES PATENT OFFICE.

ALBERT E. ROBINSON, OF CINCINNATI, OHIO, ASSIGNOR TO THE AMERICAN TOOL WORKS COMPANY, OF CINCINNATI, OHIO, A CORPORATION OF OHIO.

FRICTION-CLUTCH MECHANISM.

Application filed June 24, 1921. Serial No. 480,182.

*To all whom it may concern:*

Be it known that I, ALBERT E. ROBINSON, a citizen of the United States, residing at Cincinnati, in the county of Hamilton and State of Ohio, have invented certain new and useful Improvements in Friction-Clutch Mechanism, of which the following is a specification.

My invention relates to friction clutch mechanism primarily of the type adapted for embodiment in a reversing mechanism, for example of the right and left bevel gear type used in the tapping attachment of a drilling machine, and it is exemplified in this form for convenient illustration.

In general, the objects of my invention are to combine a friction clutch mechanism such as is represented by the Mill Patent No. 709,918, dated September 30, 1902, for friction clutch, with certain detail clutch and actuating mechanisms disclosed in the Robinson and Sosa Patent No. 1,293,552, dated February 4, 1919, for clutch.

I am aware that the use of a clutch actuator comprising an actuating bar translatably countersunk in a sleeve is old and of familiar type, represented in the Johnson Patent No. 298,979, dated May 20, 1884, for friction clutch, or in the Le Blond and Groene Patent No. 725,099, dated April 14, 1903.

As a matter of practice and commercial advantage, it is sought to produce rotary mechanism enabled to rotate at high speeds to be adequately lubricated, and to be supported in bearings appropriate to such requirements.

The general idea of the improvement may be roughly forecast by assuming the substitution, for the Mill species of clutch actuator, of the species of the said Johnson patent and Le Blond and Groene patent and the provision of bearings for the sleeve outside the intermeshing bevel gears about the sleeve.

Specifically, the positioning of the clutch actuator bar to pass operatively through an external bearing, preferably of the ball bearing type, lends to compactness and to lubricating advantage. Another object of the invention is to avoid the use of a long narrow actuating key operating full length of an elongated sleeve.

Having thus explained the present development in its evolutionary relation to the art, I will proceed to describe the figures of the drawings, constituting a part of the specification, and wherein, Fig. 1 is a bottom view of the mechanism embodying my improvements, partly broken away.

Fig. 2 is a longitudinal axial section of the same on the line 2—2 of Fig. 1.

Fig. 1$^a$ is a bottom view partly broken away of a mechanism similar to that shown in Fig. 1, but with a slight modification which will be hereinafter described.

Fig. 2$^a$ is a longitudinal axial section of the same taken on the line 2$^a$—2$^a$ of Fig. 1$^a$.

Fig. 3 is an end view of the mechanism shown in Fig. 1, partly broken away, and illustrates a detail of the clutch actuating collar and the moving means for the same.

Fig. 3$^a$ is a similar view of the modified form shown in Fig. 1$^a$.

Fig. 4 is a cross-section of my improved device partly broken away, taken on a line corresponding to the line 4—4 of Fig. 1.

Fig. 4$^a$ is a cross-section of the modified form shown in Fig. 1$^a$, partly broken away and taken on a line corresponding to the line 4$^a$—4$^a$ of Fig. 1$^a$.

Fig. 5 is a cross-section of the clutch means shown in Fig. 1, and taken on the section line 5—5 of Fig. 1.

Fig. 5$^a$ is a similar cross-section of the form shown in Fig. 1$^a$, taken on the section line 5$^a$—5$^a$ of Fig. 1$^a$.

Figs. 6 and 6$^a$ are respectively cross-sections similar to the cross-sections shown in Figs. 5 and 5$^a$, but showing the clutch operating means in operated relations.

Fig. 7 is an axial section, partly broken away, showing the clutch, gear, and bearing means, and taken on a line corresponding to the section line 7 of Fig. 6.

Fig. 7$^a$ is a similar view of the modified form taken on a line corresponding to the section line 7$^a$ of Fig. 6$^a$.

Fig. 8 is a side elevation, showing the friction band and its abutment means, partly in section on a line corresponding to the line 8—8 of Fig. 5.

Fig. 8$^a$ is a similar side elevation and section taken on the line 8$^a$—8$^a$ of Fig. 5$^a$.

Fig. 9 is a perspective view of the operating key for the friction band shown in Fig. 5; and, Fig. 9ª is a perspective view of the operating key for the friction band shown in Fig. 5ª.

In the present exemplification of my invention, the shaft 21 is represented as the driving member, and is exemplified as the shaft which extends longitudinally of the drill arm in a drilling machine for drilling metal, along which the spindle-slide which supports the drill-spindle is slidable or adjustable in any ordinary or well-known manner and by any ordinary or well known means, not shown because well known. A frame or housing 22 is exemplified as a portion of said spindle-slide, and, in the present exemplification, is represented as an oil retaining casing.

A sleeve 24 is received about the shaft, and is exemplified as translatable lengthwise of the shaft, but connected thereto so as to rotate therewith, as by providing the shaft with a longitudinal spline-way 25 in which a spline-key 26, received in a key socket 27 in the sleeve, is received. The key 26 moves with the sleeve.

In the further description of my improved device, I shall first describe the form thereof exemplified in Figs. 1 to 9 inclusive, and then describe the modified form exemplified in Figs. 1ª to 9ª inclusive.

A pair of bevel gears 31, 32, are received about the shaft and normally rotate loosely thereabout, the teeth of the bevel gears being presented toward each other. They are held in endwise separated relation by annular shoulders 33 on the sleeve, bushings 34 being interposed between the bevel-gears and said shoulders if desired. An intermediate bevel gear 35 meshes with the bevel gears of the pair of bevel gears, and, in the present exemplification, is fixed to a shaft 36, exemplified as a power transmitting shaft, to transmit the directions of motion and the speeds thereof, from the pair of bevel gears, respectively in reverse directions, to the usual tapping attachment in a drilling machine. The shaft 36 is journaled in a bearing 37 in the casing.

Friction clutch members 41, 42, rotate with the pair of bevel gears, and are shown fixed thereto, for instance by the keys 43, to form said bevel gears and friction clutch members respectively as units. Complemental friction clutch members 44, 45, complemental to said first-named friction clutch members are received about the sleeve, and are connected therewith so as to rotate with the sleeve, as by means of a key 46. The complemental friction clutch members may abut annular shoulders 47 on the sleeve.

A friction band 51 is received between the friction-faces of the coacting clutch members, and is normally contracted about the inner clutch member. A key 52 has trunnions 53 suitably pivoted in the body of the inner friction clutch member, and normally retracted by a spring 50, and is provided with a friction band abutment face 54, which contacts one end of the friction band to spread the same against the friction face of the opposing friction clutch member, the other end of the friction band being held by means of abutment blocks 55, suitably supported on the inner friction clutch member, all as more fully shown and described in the aforementioned Robinson and Sosa patent.

A key actuating bar 57, shown in the form of a spline key, is longitudinally translatable in a spline groove 58 in the sleeve, respectively shown in the end portions of the sleeve. The bars may also be received in slots 59 in the friction clutch members. This bar has a key operating part 61 thereon, shown formed with an inclined face, and is arranged to engage the coacting face 62 formed on the key for actuating the latter. A collar 63 is received about the sleeve, and is shown journaled thereon and translatable lengthwise on the sleeve, and has connection with the longitudinally movable bar for operating the same.

The clutch parts thus far described are duplicated at the respective ends of the sleeve, and are exemplified as arranged in oppositely extending axial relations and directions.

The clutches are arranged to be placed in idle relation, and the clutches are also arranged to be alternately placed in power transmitting relation for conveying reverse rotations to the shaft 36. Means exemplified for operating the clutch actuating bars are the collars 63 with which forks 65, 66, coact by being received in the annular grooves 67 of said columns. The forks are connected together by a rod 69 which slides endwise in bearings 70 in the casing. The rod is shown axially moved by means of a pin 71 fixed thereto, which is received between the tines of a fork 72 on an arm 73, fixed to a rock shaft 74 journaled in a bearing 75 of the casing, and provided with an external arm 76 for operating the same.

The gearing, clutch and clutch-operating parts, and sleeve and sleeve bearings may be located in an oil cavity 78 in the casing for ready, thorough and constant lubrication of the same. The oil is arranged to be received in the casing through a suitable opening 79, normally closed by a plug 80 threaded therein. The oil may be drained through an opening 81 closed by a threaded plug 82. The sleeve extends lengthwise of the shaft preferably at least to the end of the oil containing cavity and has bearings 85 thereabout which are preferably also in the oil containing cavity.

The bearings are exemplified as radial and end-thrust ball bearings. End plates 86 secured to the ends of the oil casing about the shaft, and having close connection with the shaft, are arranged to retain the oil in the casing. The plates may form end abutment means for the sleeve. The sleeve is also shown provided with an intermediate bearing 87.

The modified form shown in Figs. 1ª to 9ª inclusive is similar to the form of the invention shown in Figs. 1 to 9 inclusive, many of the parts being duplicates of the parts shown in the preferred form and identified by similar but primed reference numerals.

In the preferred form, having particular reference to Figs. 1, 2 and 7, the collars 63 are located respectively between the clutch members and the end bearings, whereas, in the modified form, with especial reference to Figs. 1ª, 2ª and 7ª, the end bearings are located respectively between the collars and the clutch members, the key-bars 57' passing through and rotatable with the sleeve in the bearings. It will be noted that in the preferred as well as in the modified form, the clutch members are located in endwise relations between the bevel-gears and the collars.

In the modified form, the outer end walls of the casing are provided with openings 91 for receiving the respective ends of the sleeve. End-thrust collars 92, 93, are received between shoulders 94 on the sleeve and bushings 95 about said sleeve in said openings, each of the bushings having an inner annular shoulder 96 received in inner annular recesses 97 in the inner faces of said inside end walls, arranged for retaining the oil in the casing.

In this modified form, further, the pin 71' is mounted on the arm 73' fixed to the rock-shaft 74', and the fork 72' is fixed on the axially movable rod 69'.

My improved device forms a compact arrangement of elements for producing the results desired, and ready and convenient and compact lubricating mechanism, whereby all of the operating parts may run in oil, the parts being further arranged in such manner that escape of oil beyond the desirable lubrication is avoided.

Having thus fully described my invention, what I claim as new, and desire to secure by Letters Patent, is:

1. In a friction clutch, the combination of a lubricant casing, a sleeve journaled in said lubricant casing, a shaft in said sleeve along which said sleeve is translatable, and mechanism within said lubricant casing comprising an idle member rotatable about said sleeve, a clutch member mounted about and connected with said sleeve so as to rotate therewith, clutch means for bringing said clutch member into frictional connection with said idle member, a clutch operating collar about said sleeve, said clutch member being located on said sleeve between said idle member and said collar, and a clutch rod having operative connection with said clutch operating collar, said clutch operating rod extending lengthwise of said sleeve outside the circumference of said idle member, and operating means extending from outside said lubricant casing through said lubricant casing into operative connection with said clutch actuating rod.

2. In a friction-clutch, the combination of a lubricant casing, a sleeve journaled in said lubricant casing, and mechanism within said lubricant casing comprising an idle member rotatable about said sleeve, said idle member comprising a bevel gear and a clutch member, a second clutch member mounted about said sleeve and connected thereto so as to rotate therewith, clutch means for operatively frictionally connecting said second-named clutch-member and said idle member, a clutch operating collar shiftable lengthwise of said sleeve, a bearing for said sleeve, said bearing located between said collar and said second-named clutch member, and a clutch actuating bar, one end of which is connected with said collar and the other end of which is provided with a clutch operating portion, said bar translatably countersunk in said sleeve and projecting through said bearing for permitting free rotation of the sleeve, whereby said idle member may be engaged by the clutch means and caused to rotate with said second-named clutch member, and actuating means for said collar extending from outside said lubricant casing into operative connection with said collar within said casing.

3. In reversing mechanism, the combination of a lubricant casing, a rotative support, a bearing at each end of said rotative support in said casing, a pair of unitary gears and clutch members on said rotative support between said bearings the gear portions of which are spaced-apart bevel gears presented toward each other, a third bevel gear between said last-named bevel gears to form a train of bevel gears, spaced-apart clutch members on said rotatable support, a friction clutch mechanism between each of said last-named clutch members and said respective unitary gears and clutch members, operating collars on said rotary support for said respective friction clutch mechanisms, said friction clutch mechanisms located between said collars, an actuating rod outside said pair of unitary gears and clutch members operatively connecting said operating collars, and a bearing in said lubricant casing for said operating rod, and an operating part for said rod extending from outside said lubricant casing to within said lubricant casing and having operative connection within said lubricant casing with said operating rod.

4. In reversing mechanism, the combination of bevel gears having coincident axes, members to be clutched having unitary outside end relation to said bevel gears, a rotary support extending through said bevel gears and said members, a friction clutch within each of said members to be clutched, said rotary support being provided with spline grooves at said members, separate spaced-apart bars translatably countersunk in said spline grooves, means connecting said bars from their outer ends for unitary movement, and friction clutch mechanisms actuated thereby.

5. In reversing mechanism, the combination of bevel gears having coincident axes, members to be clutched having unitary outside end relation to said bevel gears, a rotary support extending through said bevel gears and said members, bearings having outside end relation to said respective members in which said rotary support is journaled, the said rotary support being provided with spline grooves extending through said respective bearings, separate spaced-apart bars extending through said respective bearings and translatably countersunk in said respective spline grooves, means respectively having outside end relation to said bearings connecting said bars from their outer ends for unitary movement, and clutch mechanism actuated thereby.

6. In reversing mechanism, the combination of a central train of bevel gears, a pair of which have coincident axes, a shaft, a sleeve interposed between said pair of bevel gears and said shaft and translatable lengthwise of said shaft, a friction clutch member on the outer end of each of said gears of said pair of bevel gears and located about said sleeve, said friction clutch members oppositely disposed a complemental friction clutch member for each of said first-named friction clutch members having connections with said sleeve to rotate with said sleeve, a friction element between each of said first-named friction clutch-members and complemental clutch members, bearing means for said sleeve, and a pair of collars on said sleeve, the respective collars whereof are located in outside end relation to said respective bevel gears of said pair of bevel gears, a clutch actuator bar for each of said collars, and an actuator rod having operative connection with each of said collars and located parallel with said sleeve outside the circumference of said pair of bevel gears.

7. In reversing mechanism, the combination of a central train of bevel gears, a pair of which have coincident axes, a shaft, a sleeve interposed between said pair of bevel gears and said shaft and translatable lengthwise of said shaft, a friction clutch member fixed to each of said gears of said pair of bevel gears and located about said sleeve, a complemental friction clutch member for each of said first named friction clutch members having connections with said sleeve to rotate with said sleeve, a friction element between each of said first-named friction clutch members and complemental clutch members, bearing means for rotatively supporting said sleeve, and collar clutch actuating mechanism having operative connections with said respective friction elements, the said clutch-actuating mechanism comprising a pair of longitudinally slidable spaced apart key means in said respective friction clutch members and said respective bearing means, and means outside said pair of bevel gears connecting said key means.

8. In reversing mechanism, the combination of a rotatable support, a pair of bevel gears presented toward each other loose about said rotatable support, a friction clutch member for each of said bevel gears forming a unit therewith, a pair of friction clutch members having connection with said rotatable support to rotate therewith and respectively complemental to said first-named friction clutch members, a friction element between each of said first-named friction clutch members and its complemental friction clutch member, spaced apart keys for operating said respective friction elements, the said friction clutch members and friction elements respectively located in opposite end relations to said pair of bevel gears, bearings rotatively supporting said rotatable support in outside end relation to said respective friction clutch members, separate spaced apart key operating mechanisms sunk in said rotatable support at said respective friction clutch members and translatable therein, a lubricant casing in which said parts are mounted, and operating means for said respective key operating mechanisms extending from outside said lubricant casing and having operative connections with said key operating mechanisms inside said lubricant casing.

9. In reversing mechanism, the combination of bevel gears having coincident axes, members to be clutched having unitary outside end relation to said gears, a sleeve extending therethrough, a shaft within the sleeve, friction bands fixed on the sleeve within said members to be clutched, the said sleeve being provided with spline grooves at its ends, separate bars at the ends of said sleeve translatably countersunk in said spline grooves, means connecting said bars from their outer ends for unitary movement, and clutch mechanism actuated thereby.

10. In reversing mechanism, the combination of bevel gears having coincident axes, members to be clutched having unitary outside end relation to said gears, a sleeve extending therethrough, friction bands fixed on said sleeve within said members to be clutched, the said sleeve being provided with spline grooves at its ends, separate bars at the ends of said sleeve respectively translatably countersunk in said spline grooves, means connecting said bars from their outer ends for simultaneous movements of said bars, clutch mechanism actuated thereby, an oil casing in which said parts are mounted, a shaft along which said sleeve is translatable, and means between said sleeve and said shaft to cause the same to rotate together.

11. In reversing mechanism, the combination of bevel gears having coincident axes, members to be clutched having unitary outside end relation to said gears, a sleeve extending therethrough, friction bands fixed on said sleeve within said members to be clutched, the said sleeve being provided with spline grooves at its ends, bearings for said sleeve received about said spline grooves, separate bars at the ends of said sleeve respectively translatably countersunk in said spline grooves and received through said bearings, means connecting with said bars outside said bearings for combined movements of said bars, clutch mechanism actuated thereby, a shaft along which said sleeve is translatable, and means between said shaft and said sleeve to cause simultaneous rotations thereof.

12. In reversing mechanism, the combination of a central train of bevel gears, a pair of which have coincident axes, a shaft, a sleeve interposed between said pair of bevel gears and said shaft and translatable lengthwise of said shaft, a friction clutch member held to each of said pair of bevel gears and located about said sleeve, a complemental friction clutch member for each of said first-named friction clutch members arranged to rotate with said sleeve, a friction element between each of said first-named friction clutch members and its complemental clutch member, a key actuating bar for each of said friction elements, bearings arranged in outside end relation to said friction clutch members and said pair of bevel gears, an actuating bar for each of said friction elements sunk in the end portion of said sleeve and received through the bearing adjacent thereto, and operating means for said bars connecting with said bars in outside end relation to said bearings, and comprising a bar extending lengthwise of said sleeve outside the journal portions of said bearings, said clutch-members and said pair of bevel gears.

In testimony whereof, I have hereunto signed my name in the presence of two subscribing witnesses.

ALBERT E. ROBINSON.

In presence of—
    LOUIS T. MURPHY,
    DELMA WERNSING.